Sept. 16, 1941. C. R. HUBBARD 2,256,343
MACHINERY PACKING
Filed April 26, 1940 2 Sheets-Sheet 1
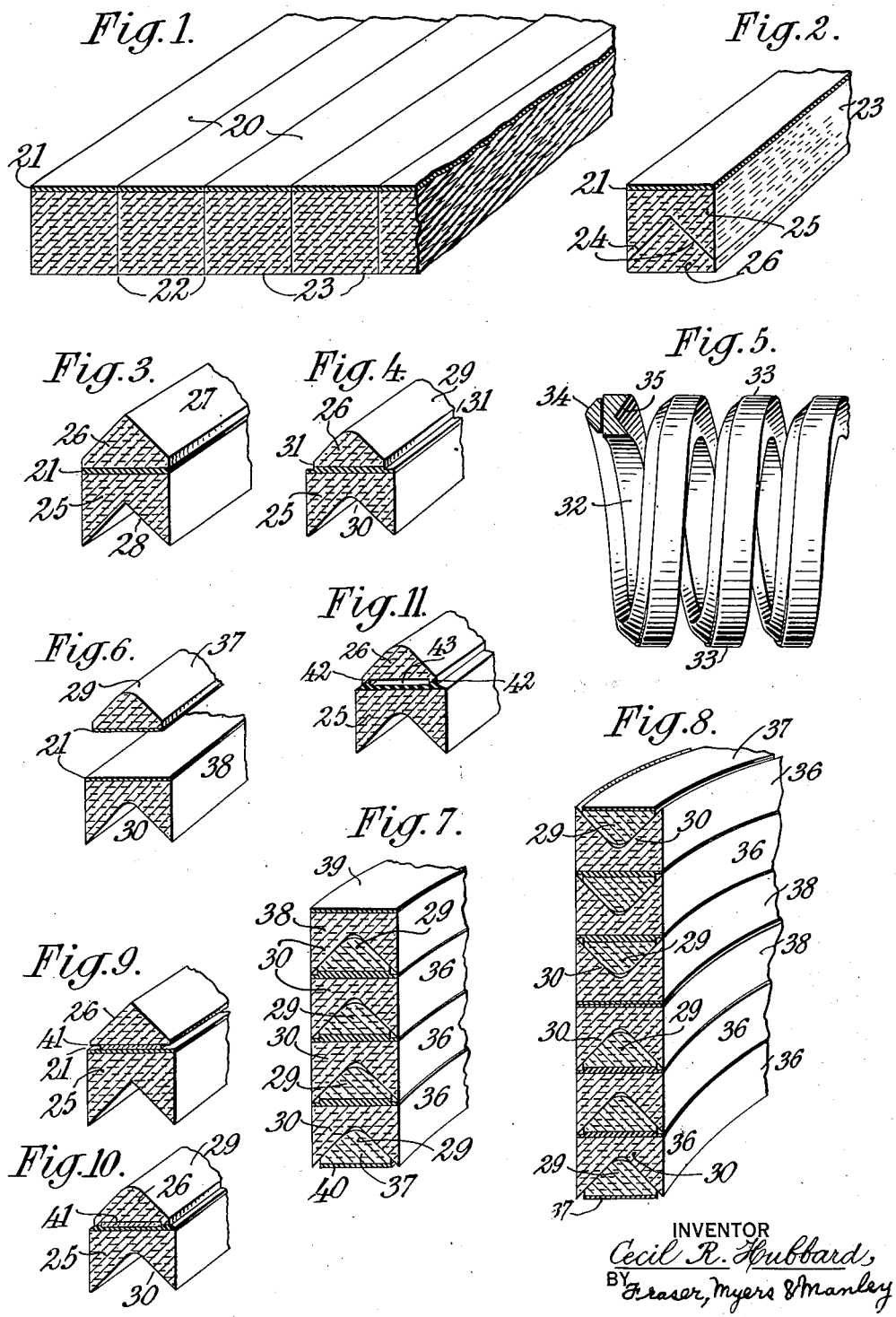

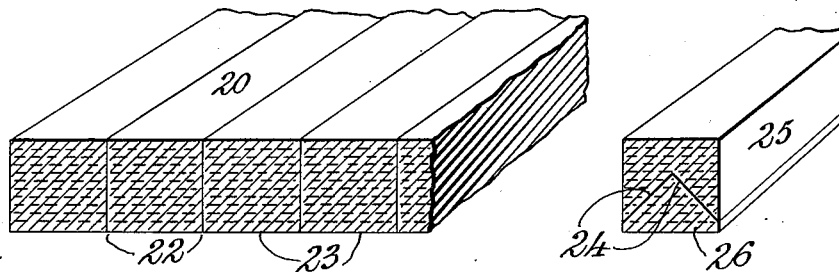
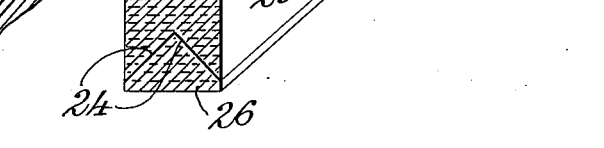
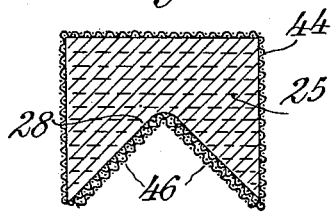
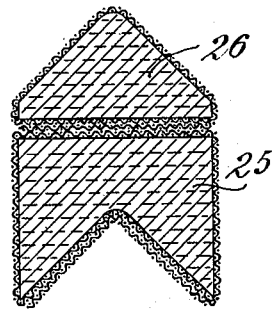
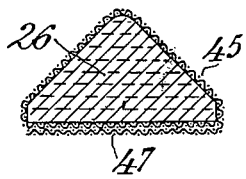

Patented Sept. 16, 1941

2,256,343

UNITED STATES PATENT OFFICE 2,256,343

MACHINERY PACKING

Cecil R. Hubbard, Palmyra, N. Y., assignor to The Garlock Packing Company, Palmyra, N. Y., a corporation of New York Application April 26, 1940, Serial No. 331,696

5 Claims. (Cl. 288—5)

This invention relates to improvements in machinery packing material and methods of making such material. It has particular application to the manufacture of machinery packing which has been sold to the trade as "automatic" packing and to methods of making such packing. The method, claims to which have been excluded from this application, has been made the subject-matter of a divisional application, Serial No. 360,901, filed October 12, 1940.

As an illustration of what is referred to herein as automatic packing, reference may be had to the patent to Hubbard et al., No. 1,771,890, from which it will be observed (see Fig. 1) that each of the packing rings 20 has lateral surfaces, one of which is concave and the other convex. The rings are so positioned that the pressure of the fluid, the escape of which it is the purpose of the packing to prevent, will be forced between the successive rings of the assembly and will be caused to force the angular lips in contact with the piston into frictional engagement therewith, which will vary in accordance with such pressure. As the pressure increases, the effectiveness of the seal afforded by the packing will increase; as the pressure falls off, the frictional engagement between the packing and the piston surface will decrease.

It may be noted that when using packing of this character (see, again, Fig. 1 of the above-mentioned patent to Hubbard et al.), it is necessary to provide adapter rings, such as the rings 21, 22, at the ends of the assembly, in order to provide plane surfaces to conform with opposing surfaces 33, 34 of the stuffing-box.

When manufacturing packing having plane, lateral surfaces, such as is disclosed in the Trumbull patent, No. 1,455,682, the necessity to provide end adapter rings of special form does not arise, and the packing may be manufactured in coils from which any desired number of rings may be cut at will and used as a complete packing assembly. It has been found impracticable to make and sell automatic packing, such as is illustrated in the above-mentioned patent to Hubbard et al., in coiled strips of material length from which packing rings may be cut as required, because of the need for the specially formed end adapter rings.

It is one of the principal objects of this invention to provide strip material adapted to be stored and shipped in coils, from which any desired number of packing rings may be cut, the material being of a character such that any section cut from the coil may be readily separated into parts of cross-sectional form such as to serve as end adapter rings for a packing assembly.

In the following description of various preferred forms of packing material embodying the invention, reference will be had to the accompanying drawings in which—

Figure 1 is a representation of a fragment of a slab of material which may be subdivided into strips from each of which stock embodying the invention may be made as a result of further treatment;

Fig. 2 is a representation of a fragment of one of the strips which may be cut from the slab illustrated by Fig. 1;

Fig. 3 is a representation of a fragment of material resulting from the reassembly of separated parts of the material illustrated by Fig. 2;

Fig. 4 is a representation of a fragment of material resulting from the molding and vulcanization of the material illustrated by Fig. 3;

Fig. 5 is a representation of part of a coil of the strip material illustrated by Fig. 4;

Fig. 6 is a representation of fragments of parts of the material resulting from the severance of a section of the stock illustrated by Fig. 5;

Fig. 7 represents a fragment of a packing assembly comprising a plurality of rings of the stock illustrated by Fig. 5 associated with end adapter rings of separated parts of such stock as indicated by Fig. 6;

Fig. 8 is a representation of a packing assembly adapted, when assembled in a stuffing-box, to resist a flow of fluid in either of two directions, said assembly consisting of rings cut from the stock illustrated by Fig. 5 associated with centrally disposed and end adapter elements consisting of separated parts such as are indicated by Fig. 6;

Fig. 9 represents a fragment of elements conforming with those illustrated by Fig. 3 associated with an additional element, which, by further treatment, may be developed into a modified form of packing stock illustrated by Fig. 11;

Fig. 10 represents a fragment of material resulting from the molding and vulcanization of the assembly illustrated by Fig. 9, but prior to the removal of the added element to produce the final product;

Fig. 11 represents a fragment of finished stock resulting from the withdrawal of the metal strip included as an element of the partly completed stock illustrated by Fig. 10;

Fig. 12 represents a fragment of a slab of material from which may be cut a plurality of strips, each of which, by further treatment, may be developed into a second modified form of packing stock;

Fig. 13 is a representation of a fragment of one of the strips of material which may be cut from the slab illustrated by Fig. 12;

Figs. 14 and 15 represent in cross section separated parts of a strip of material such as is illustrated by Fig. 13, each enveloped by a covering of fabric and partly vulcanized in order to resist changes of form during further treatment; and Fig. 16 represents in cross section a reassembly of the parts illustrated by Figs. 14 and 15, the same having been united and further vulcanized to produce a finished product.

Although the herein disclosed invention is intended to be of more or less general application, it will be exemplified by disclosures of various preferred forms of stock, pertaining specifically to piston-rod packing adapted to be assembled in an ordinary stuffing-box.

Having reference first to the form of the invention to be described with the aid of Figs. 1 to 8, inclusive, Fig. 1 represents a fragment of a slab of material 20 of properties such that, by an appropriate curing treatment, it may be caused to have the physical characteristics of resilient, vulcanized rubber composition. To one of the two surfaces of this slab of most extensive area is applied a thin layer 21 of tacky material which, when vulcanized, may serve as a binding means of relatively weak adhesiveness as compared with the texture of the body portion of the slab.

The slab 20 may be of relatively great length and of a width such that it may be severed by cutting along planes 22 into a plurality of strips 23, a fragment of one of which is illustrated by Fig. 2, said strips being of a cross-sectional area such that they may be developed by further treatment into a finished packing stock of predetermined dimensions, embodying the invention.

The strip 23, as illustrated by Fig. 2, may be severed lengthwise by a V-shaped cut 24 into two parts 25, 26, which may be separated and reassembled in the relative positions illustrated by Fig. 3, with the protuberant angular portion 27 facing in one direction and the reentrant angular portion 28 facing in the opposite direction.

In view of the tacky character of the unvulcanized elements 25, 26, and the intervening layer of tacky material 21, the reassembled elements of the structure illustrated by Fig. 3 may, by a relatively slight degree of pressure, be caused to unite so as to be handled as a single product during further treatment.

The reassembled strip of material illustrated by Fig. 3 may next be subjected to a molding treatment such as to convert it into a product a fragment of which is illustrated by Fig. 4, said product having complementary convex and concave surface portions 29, 30, facing in opposite directions; and, preferably, as a part of the same step of the treatment, the molded product will be vulcanized to the desired physical consistency.

Preferably, the molding treatment will be such as to cause the product, as illustrated by Fig. 4, to have longitudinally disposed, reentrant angular portions 31 at the opposite sides of the base of the part 26 having the convex surface portion 29.

The stock, a fragment of which is illustrated by Fig. 4, may be developed during its manufacture into a coil, preferably a helical coil 32 (Fig. 5), of a diameter appropriate for its intended use, and if, as herein specifically disclosed, the material is to be used as stock to be cut into rings for packing assemblies to be assembled in an ordinary stuffing-box, the axis of the coil may, as has been indicated, be so disposed with respect to the surfaces of the material as to have outer and inner cylindrical surfaces 33, 33, and laterally disposed, convex and concave surfaces 34, 35.

With a coil 32 (Fig. 5) of stock such as that illustrated in Fig. 4 as a source of supply, rings 36 of a packing assembly (Fig. 7) may be cut and mounted in an ordinary stuffing-box with their adjacent convex and concave surface portions 29 and 30 nested one within another, and a single ring cut from the same coil of stock may be readily separated, as indicated by the fragmentary illustration, Fig. 6, into two parts 37, 38, due to the relatively weak adhesion of the layer of binding material 21. These elements 37 and 38 are of forms such as to serve as adapter rings for the ends of the packing assembly illustrated by Fig. 7, the convex portion 29 of ring 37 being nested in the concave portion 30 of one end ring 36 of the assembly, and the concave portion 30 of the other element 38 being caused to cap the convex portion 29 of the other end ring 36 of the assembly.

These adapter rings 37, 38 thus serve as a means of providing plane, exposed, surface portions 39, 40, to conform with the plane surfaces at the ends of an ordinary stuffing-box in which the assembly may be mounted.

Should it be desired to assemble the rings of a packing assembly in a stuffing-box in a manner such as to be adapted to resist the flow of fluid in either of two directions, as illustrated in Fig. 8, this may readily be accomplished by dividing two rings cut from the coil 32 (Fig. 5) of material, such as is shown in Fig. 4, into separate parts such as are illustrated by Fig. 6, in order to provide two pairs of adapter rings, the adapter rings 38 being mounted at the center of the assembly with their concave surface portions 30 capping the convex portions 29 of adjacent rings 36 of the assembly, and the two adapter rings 37 being mounted at opposite ends of the assembly with their convex surface portions 29 nested within the concave surface portions 30 of the adjacent rings 36.

The form of the invention illustrated by Figs. 9, 10 and 11 and the method of making the same differ from the method and product hereinbefore described only in that, when reassembling the severed parts of a strip of material such as is illustrated by Fig. 2, in preparation for the following molding and vulcanizing treatment, a thin ribbon of metal 41 is interposed, as indicated in Fig. 9, in association with the layer of tacky material 21 between the parts 25, 26 of the structure to be united. In view of the tacky nature of the unvulcanized material of the parts illustrated by Fig. 9, as well as of the thin layer of binding material, the reassembled parts may be united by a relatively slight degree of pressure so as to be handled as a unit during further treatment.

The molding and vulcanization of the reassembled packing structure illustrated by Fig. 9 will result in a product a fragment of which is shown in Fig. 10, which differs from that illustrated by Fig. 4 only as to the inclusion of the inserted metal ribbon 41, which is of a width such that it may be completely enveloped by material of the parts with which it is associated. Subsequent to the molding and vulcanization of the packing stock illustrated by Fig. 10, the metal strip may be removed, thus resulting in a modified form of stock a fragment of which is illustrated by Fig. 11, said modified form having its parts 25, 26 united by a pair of thin, relatively narrow layers of material 42 separated by the space 43 from which the metal strip was removed.

Packing rings and adapter rings may be cut from stock such as is illustrated by Fig. 11 and used exactly as in the case of the stock illustrated by Fig. 4, the thin, narrow strips of material 42 serving as the uniting means of relatively weak adhesiveness to facilitate the separation of the parts of the stock bearing the convex and concave surface portions.

The form of the invention illustrated by Figs. 12 to 16, inclusive, and the method of making the same differ from the forms and methods hereinbefore described, in that, as illustrated by Figs. 12 and 13, the thin layer of tacky material 21 is not applied to the slab 20 and is not, therefore, an element of the strip of material illustrated by Fig. 13.

As in the forms hereinbefore described, the slab 20 is cut into a plurality of strips 23 along planes 22, as indicated in Fig. 12, and the strip illustrated by Fig. 13 is severed longitudinally by a V-shaped cut 24 to produce the elements 25, 26. These elements are then separated, and, as is indicated in Figs. 14 and 15, they are completely covered by layers of fabric 44, 45, which, due to the tacky nature of the unvulcanized material, may be readily caused to adhere to the same. The strip of fabric 44 of the element 25, as illustrated in Fig. 14, may preferably be of a width such as to overlap, as at 46, along the reentrant angle 28 of the element 25, and the strip of fabric 45 in which the element 26 is enveloped may preferably be of a width such as to overlap, as at 47, along the uncut plane surface of said part. The overlapping portions of the fabric may be caused to adhere by the application of suitable adherent material, after which the two elements illustrated by Figs. 14 and 15 may be molded to the desired forms and partially vulcanized in order that they may be adapted to resist detrimental changes of form during subsequent steps of the treatment to produce the finished product.

The molded and partly vulcanized elements illustrated by Figs. 14 and 15 may be reassembled, as shown in cross section by Fig. 16, and united by the application of rubber cement, or any other suitable adherent, to their opposed, fabric-covered, uncut plane surfaces, the adherent used being such as to serve as a binding element of relatively weak adhesive properties after being subjected to the final process of vulcanization.

The reassembled elements as illustrated in Fig. 16 are subjected to further vulcanization to complete the curing of the united parts 25, 26, thus resulting in the production of stock which may be cut into rings for use as elements of packing assemblies and portions of which may be separated and used as adapter rings for the end elements of such packing assemblies in a manner which has been explained in detail as a part of the description of the form of the invention illustrated by Figs. 1 to 8, inclusive.

The material to be used in the manufacture of packing stock in accordance with the teachings of the herein disclosed invention may be of any appropriate type of rubber composition or other matter which, when subjected to a suitable curing treatment, may have the physical properties of resilient, vulcanized rubber composition. Such compositions may, if desired, include fibrous material of any appropriate character. The specific type of composition used will depend upon the conditions of service to which the packing may be expected to be subjected. One type of composition may be used if the packing is to be subjected to relatively high temperature. Another composition may be used if the packing is to be exposed to oils or other rubber solvents. Other compositions may be used if the packing is to be exposed to corrosive chemicals. The invention, however, is adapted for application to any type of strip packing stock from which portions may be cut for use as elements of a packing assembly and of which any part of the stock may be separated and caused to serve as adapter elements for the ends of the assembly having surface portions adapted to conform with opposed surface portions of an enclosure in which the packing is to be used.

The invention is not intended to be limited to any of the specific forms which have been selected for purposes of illustration, but should be regarded as including modifications and variations thereof within the scope of the appended claims.

What is claimed is:

1. Strip material adapted for use as machinery packing stock, said material having oppositely disposed, complemental surface portions, one concave and the other convex, whereby sections of the stock may be assembled with the convex portion of one nested in the concave portion of another, the respective parts of the stock bearing the convex and concave portions being spaced from each other but bound together by intervening material of relatively weak adhesiveness, as compared with the texture of the united parts, to facilitate their separation, whereby one part of a section of the stock may have its convex portion nested in the exposed concave portion of a section of a packing assembly and the other part of the same section may be readily separated and caused to have its concave portion cap the exposed convex portion of another section of the assembly, the separated surface portions of the parts of the disintegrated section of stock which may thus be caused to serve as exposed surface portions of a completed packing assembly being of forms materially different from the concave and convex surface portions of the stock in order that they may conform with surface portions of an enclosure within which the packing is to be used and with which they are designed to have snug contact.

2. Strip material, as defined by claim 1, having, as the means for uniting the parts bearing, respectively, its concave and convex surface portions, a thin layer of the material of relatively weak adhesiveness, interposed between said portions and extending from one surface of the stock to an opposite surface thereof.

3. Strip material, as defined by claim 1, having, as the means for uniting the parts bearing, respectively, the concave and convex surface portions, a pair of spaced, narrow, thin, marginal layers of the material of relatively weak adhesiveness.

4. Strip material, as defined by claim 1, of which each of the two parts bearing, respectively, the concave and convex surface portions, consists of matter having the physical properties of resilient, vulcanized rubber composition, each of said parts being completely enveloped by an adherent covering of textile fabric, and the opposed, fabric-covered portions of said parts being united by means capable of exerting but a limited degree of adherence such as to serve as the relatively weak binding means relied upon to facilitate their separation.

5. A coil of strip material, such as is defined by claim 1, comprising a strip of stock of a length such that a plurality of packing elements may be cut therefrom for use as a multiple-section packing assembly and of which any portion of the material cut from the coil may be readily separated longitudinally into two parts for use as marginal adapter elements having surface portions adapted to conform with opposed surface portions of an enclosure in which the packing is to be used.

CECIL R. HUBBARD.